Sept. 20, 1955  L. HAWORTH ET AL  2,718,114
ENGINE CONTROL SYSTEM RESPONSIVE TO WORKING FLUID
TEMPERATURE AND TO ATMOSPHERIC PRESSURE
Filed Nov. 1, 1954  2 Sheets-Sheet 1

United States Patent Office 2,718,114
Patented Sept. 20, 1955

2,718,114

ENGINE CONTROL SYSTEM RESPONSIVE TO WORKING FLUID TEMPERATURE AND TO ATMOSPHERIC PRESSURE

Lionel Haworth, Littleover, Derby, David Omri Davies, Kingsway, Derby, and Derek Howard Jubb, Manningham, Bradford, England, assignors to Rolls-Royce Limited, Derby, England, a British company Application November 1, 1954, Serial No. 466,168

Claims priority, application Great Britain November 17, 1953

3 Claims. (Cl. 60—39.28)

This invention relates to engine control arrangements and is concerned with control arrangements whereby the temperature at a selected point in an engine is prevented from exceeding a selected value.

In liquid-fuel-burning engines it is convenient to prevent the temperature of a part of the engine from exceeding the selected value by arranging that the fuel supply to the engine is automatically reduced when the working fluid temperature at a selected point tends to exceed the selected value. Similarly to prevent the temperature falling below the selected value, it may be arranged that the fuel supply is automatically increased when the temperature falls below the selected value.

This invention provides an improved control whereby the fuel supply is reduced when the selected value of the temperature is exceeded. In certain cases, the control may also be arranged to increase the fuel supply when the temperature falls below the selected value, thereby to maintain the selected temperature.

According to the present invention, an engine control of the kind in which a liquid fuel supply to the engine is cut down when the working fluid temperature at a selected point in the engine tends to exceed a selected value is characterized by comprising temperature-sensitive means arranged to be sensitive to the temperature at said selected point, a fuel supply control element, pressure-responsive means arranged to load said fuel supply control element to vary the fuel supply according to the pressure it senses, a pressure fluid source connected to apply to said pressure-responsive means a pressure which is a proportion of the pressure at said source, means to control the pressure of said source, and valve means arranged to be adjustable to vary said proportion of the pressure at said source and thereby the pressure to which said pressure-responsive means is subjected, so that variation in one sense causes a reduction in the fuel supply, said valve means being connected to be adjusted by the temperature-sensitive means to be moved to adjust said proportion in said one sense when said selected temperature is exceeded.

According to a feature of the invention, variation of said proportion of the pressure of the pressure fluid source in a sense opposite to said one sense may be arranged to cause an increase in the fuel supply, the valve means being connected to be adjusted to vary the proportion in said opposite sense when the temperature falls below the selected value.

According to a preferred feature of this invention, the means to control the pressure of said pressure fluid source is adapted to maintain the pressure at a value which exceeds the pressure within the air intake of the engine, or the ambient atmospheric pressure, by a selected amount. In one arrangement according to this feature of the invention, the pressure fluid source comprises a primary pressure fluid source having a pressure in excess of the desired pressure for said pressure fluid source, a pressure-reducing valve between said primary source and the proportion-varying valve means, and pressure-sensitive means to load said pressure-reducing valve, said pressure-sensitive means being loaded in the sense of closure by the fluid pressure downstream of the pressure-reducing valve and being loaded in the sense of opening by the pressure within the engine air intake, or by the ambient atmospheric pressure, and by a spring.

According to another preferred feature of the invention the proportion-varying valve means is adjustable between a first limiting position in which said pressure-responsive means is subjected to the pressure of said fluid source and a second limiting position in which it is subjected to a lower pressure.

According to one arrangement of this feature of the invention, the proportion-varying valve means comprises a shuttle valve element arranged to co-operate with a pair of aligned ports through one of which said pressure-responsive means is connected to said pressure fluid source and through the other of which said pressure-responsive means is connected to the pressure in the air intake or to atmospheric pressure. In one arrangement according to this feature of the invention, the shuttle valve element is arranged to be loaded by a Bourdon tube against an opposing load of a spring, the Bourdon tube forming part of said temperature-sensitive means, and the spring having an adjustable abutment by means of which its opposing load can be adjusted to vary the value of the selected temperature.

According to yet another preferred feature of this invention, the fuel supply control element comprises a bleed valve in a servo system arranged to control the fuel supply to the engine. In one arrangement according to this feature of the invention, the bleed valve element is carried on a pivoted lever having connected to it an evacuated expansible capsule and in opposition thereto a second capsule which is subjected internally to a pressure which in normal operation lies between the pressure of the fluid source and engine intake pressure (or atmospheric pressure), according to the position of said valve means. At the selected temperature the shuttle valve element will preferably be arranged to be midway between the aligned ports, so that the pressure to which the second capsule is subjected will be the mean of the pressure at the source and engine intake pressure (or atmospheric pressure). It is arranged that closing of the bleed valve increases the fuel supply to the engine, and that when the shuttle valve moves towards the first position the load due to the capsules and tending to close the bleed valve is increased, and when the shuttle valve moves towards said second position the load tending to close the bleed valve is reduced. The lever also has connected to it a member subjected to the pressure drop across the engine throttle to apply a load to the lever tending to open the bleed valve and the lever is also subjected to a spring load tending to close the bleed valve.

The present invention has an important application in preventing the temperature of parts of gas-turbine engines from exceeding a preselected value, thereby to avoid damage to these parts due to overheating.

There will now be described one control arrangement of this invention as applied to a gas turbine engine having a two-stage turbine. The description refers to the accompanying drawings in which.

Figure 1:
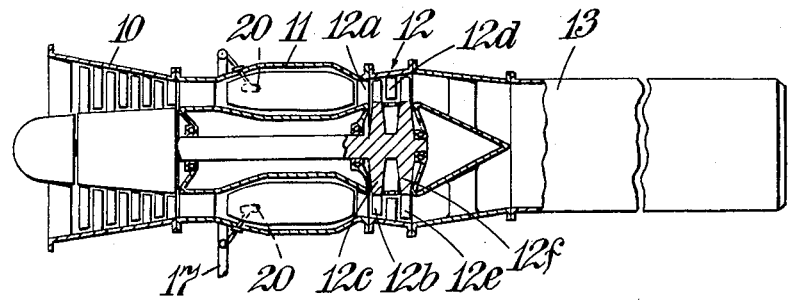
Figure 1 illustrates diagrammatically the gas turbine engine.

Referring first to Figure 1, the gas-turbine engine comprises a compressor system 10 drawing in air from an air intake, combustion equipment 11 connected to receive compressed air from the compressor system and to have fuel burnt therein, a two-stage axial-flow turbine 12 connected to receive the products of combustion from the combustion equipment and an exhaust assembly 13 to receive the combustion products from the turbine 12.

The turbine comprises a row of high-pressure nozzle-guide vanes 12a, a row of rotor blades 12b carried by the high-pressure turbine disc 12c, a row of low-pressure nozzle-guide vanes 12d, and a row of rotor blades 12e carried by the low-pressure turbine disc 12f, through which rows the working fluid passes in order.

The fuel system for supplying fuel to the combustion equipment comprises a fuel pump 14 drawing fuel through a suction pipe 15 from a fuel tank 16 and delivering through a pressure pipeline 17 past a control throttle 18 and a high-pressure shut-off cock 19 to fuel injectors 20 of the combustion equipment.

Figure 2:
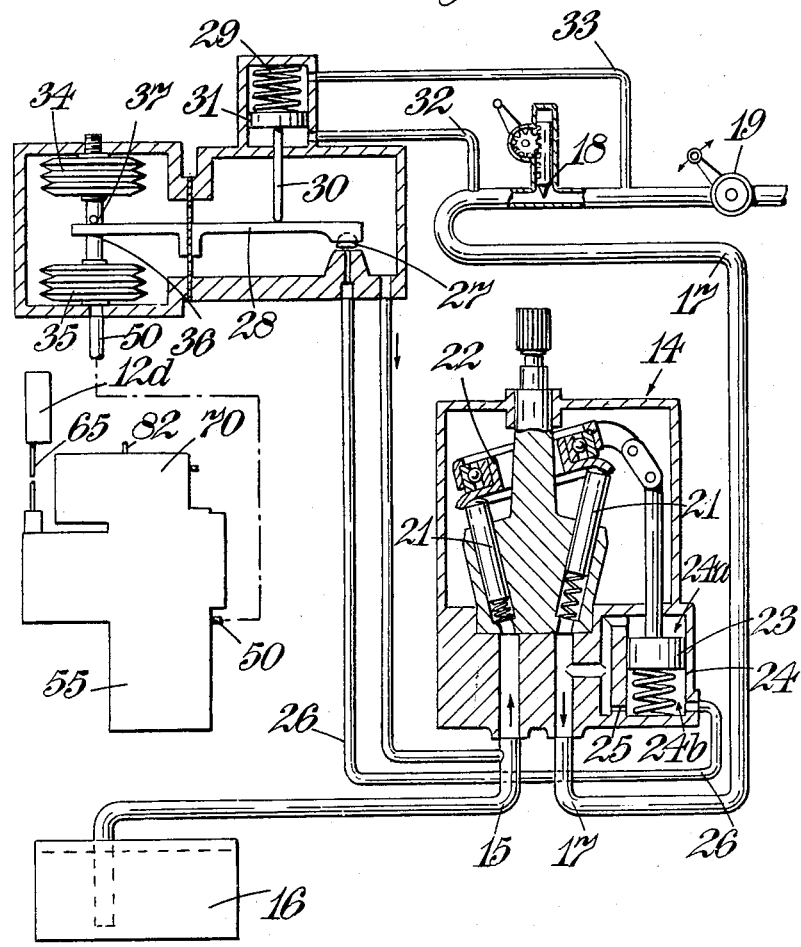
Figure 2 illustrates a typical fuel system for a gas turbine as illustrated in Figure 1.

The pump is a multi-plunger positive-displacement pump of the kind (Figure 2) whereof the fuel delivery is varied by varying the stroke of the pump plungers 21. The stroke of the plungers 21 is controlled by a swashplate mechanism 22 the angle of inclination of which is under control of a servo piston 23 working in a cylinder 24 of which one cylinder space 24a is connected directly to the pump delivery 17 and the other cylinder space 24b is connected to the pump delivery 17 through a restricted orifice 25 and also has a bleed outlet flow line 26, whereby a pressure difference is produced across the piston which controls the position of the piston 23 within the cylinder 24.

The bleed outlet leads back to the suction pipe 15 of the pump 14 and flow through the bleed outlet is controlled by a bleed valve in the form of a half-ball 27 carried by a pivoted lever 28. As the half-ball 27 lifts so the bleed flow increases and the pressure within the second cylinder space 24b decreases, and it is arranged that such decreased pressure is accompanied by a movement of the servo piston 23 to decrease the stroke of the pump plungers 21 and thus the delivery of the pump 14. Conversely, closure of the half ball 27 causes an increase in the fuel delivery of the pump.

The pivoted lever 28 is controlled as to its position by three principal loads.

The first load is a load due to a spring 29 applied to the lever in the sense of closing the half-ball valve by means of a push rod 30.

The second load is applied by the push rod 30 also and it is applied to the push rod 30 by means of a piston element 31 and loaded on one side through a connection 32 by the pressure upstream of the throttle 18 and on the opposite side through a connection 33 by the pressure just downstream of the throttle 18, it being arranged that the load due to the pressure difference across this piston 31 opposes the effect of the spring 29. Increase of this load thus reduces the load which is applied to the lever 28 by the spring 29 in the sense of closing the half-ball valve 27. This load could clearly be applied direct to the lever 28 by positioning the piston element 31 on the other side of the lever.

The third load is applied by a pair of resilient expansible capsules 34, 35 which are connected together by a rod 36 and disposed one on each side of the lever 28, the rod 36 having a peg 37 projecting from it to engage one side of the lever 28. The capsule 34 on the same side of the lever as the peg 37 is evacuated and the other capsule 35 is arranged to be subjected internally through a conduit 50 to a pressure which is derived as described below. It is arranged that increase of the pressure in the capsule 35 reduces the load applied by the capsule assembly through the peg 37 to the lever 28 to that the half ball tends to close the bleed valve, so increasing the fuel supply. The apparatus so far described is well known.

The second capsule 35 is subjected internally to a pressure which normally lies between the ambient atmospheric pressure, or the pressure in the air intake of the engine, and a pressure which is a predetermined amount above the atmospheric pressure or air intake pressure, and the arrangement also includes temperature-sensitive means to control the pressure which is applied within the second capsule 35.

Figure 3:
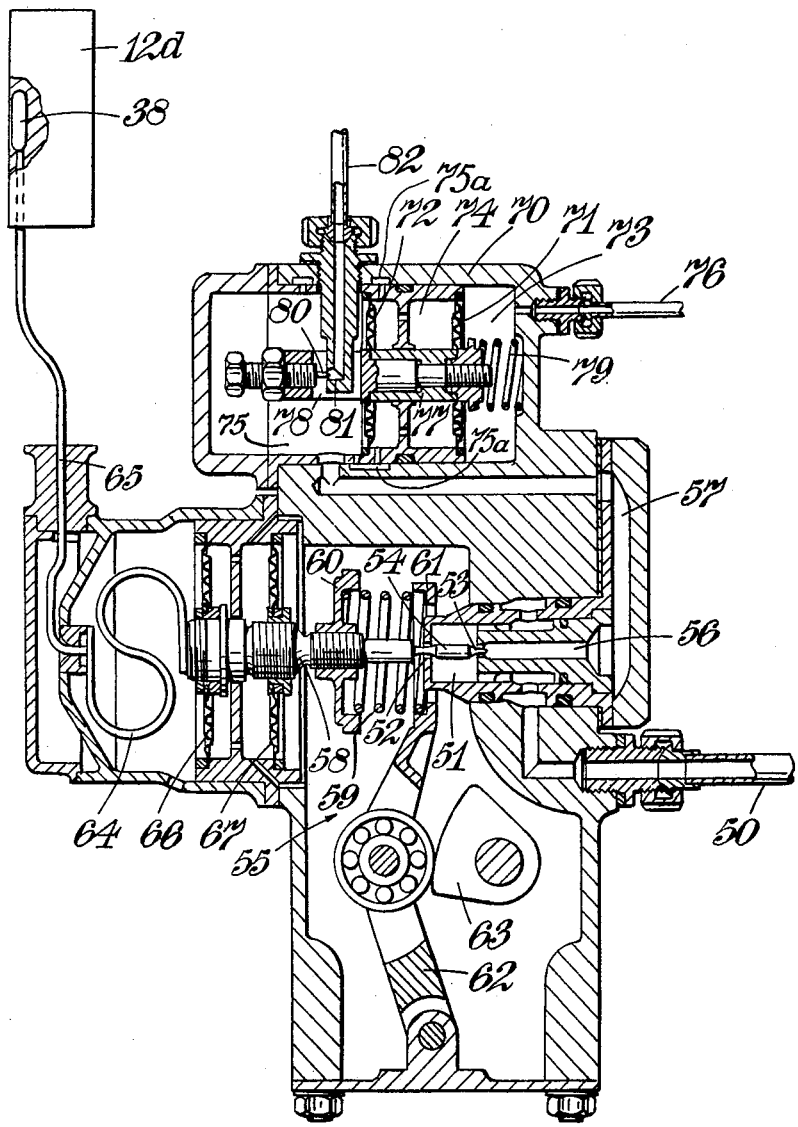
Figure 3 illustrates a form of the control of this invention suitable for use with the fuel system of Figure 1.

In one arrangement of temperature-sensitive means for this purpose, the conduit 50 leads from internally of the second capsule 35 to a valve chamber 51 (Figure 3) having a pair of ports 52, 53 opening into it, which ports are aligned with one another and have co-operating with them a shuttle valve element 54. One of the ports 52 opens to a space 55 at substantially engine intake pressure (or atmospheric pressure) and the other of the ports 53 opens to a second chamber 56 connected by a conduit 57 to a pressure fluid supply source. In one limiting position of the shuttle valve element 54 the one port 52 is closed and in the second limiting position of the shuttle valve element 54 the other port 53 is closed and thus by moving the shuttle valve element 54 the pressure within the capsule may be varied between the pressure of the source and the engine intake (or atmospheric) pressure.

The shuttle valve element 54 is controlled by a tappet 58 movable lengthwise of the valve element and engaging one end of it, and the tappet is spring-loaded away from engagement with the shuttle valve element by a spring 59 having one abutment 60 on the tappet and a second abutment 61 on a rocking lever 62 the position of which is controlled by a manually-adjustable cam 63 by which the value of the temperature to be controlled is selected. The tappet 58 is loaded in a direction towards the shuttle valve element 54 by means of a Bourdon tube 64 so arranged that when the tube expands the load tending to move the tappet 58 against the spring 59 increases. The Bourdon tube itself is connected by tubing 65 to one or more bulbs 38 which are housed within the leading edges of vanes of the low-pressure nozzle-guide vane assembly 12d and are thus subjected to the temperature of the working fluid between the turbine stages, and the bulbs 38 and Bourdon tube 64 are filled with mercury. When the temperature sensed by the bulbs 38 increases the vapour pressure of the mercury increases, thus increasing the pressure within the Bourdon tube 64 causing it to extend and to move the tappet 58 against the action of the spring 59. When the temperature exceeds the selected value at which the temperature is to be controlled, as determined by the setting of the cam 63, the shuttle valve element 54 is forced towards its second limiting position to restrict the port 53 leading to the pressure fluid source and to open the port 52 to a greater extent and thus the capsule 35 above-mentioned has the pressure in its interior reduced and the half-ball valve element 27 is lifted and the fuel supply to the engine is cut down. When the temperature falls below the selected value the shuttle valve element 54, due to the pressure drop across it and to the action of spring 59, is moved towards its first limiting position to further open the port 53 communicating with the pressure fluid source, and to restrict the port 52 leading to the space 55 at engine intake pressure or atmospheric pressure, and thus the pressure in the interior of the capsule 35 is increased and the half-ball valve element 27 is moved in the sense of closing and the fuel supply is increased.

The tappet 58 connected to the Bourdon tube 64 is mounted centrally of a pair of flexible metallic diaphragms 66, 67 connected to the casing at their peripheries. In this way the amount of movement of the tappet 54 for a given change of force exerted by the Bourdon tube 64 may be increased over the operating range of movement. The space between the diaphragms 66, 67 is either connected to the space 55 so as to fill with engine oil without trapping air, or filled with a silicone fluid of which the viscosity is constant with temperature. The diaphragms and the walls which extend between them have a dash-pot effect on the motion of the assembly.

In this particular arrangement the pressure fluid source is controlled to have a pressure which exceeds the pressure within the engine air intake by a selected amount, say 7 lbs./sq. in., and for this purpose the following arrangement may be employed. There is provided a casing 70 which is divided by a pair of flexible metal diaphragms 71, 72 into three spaces 73, 74, 75, one end space 73 of which is connected to the air intake by a conduit 76 so that the pressure within it is the pressure within the air intake, while the central space 74 is connected through ducts 75a to the other end space 75 which in turn is connected by conduit 57 to the second chamber 56 of the shuttle valve arrangement. The use of a pair of diaphragms 71, 72 results in the advantage mentioned above in this application also. The diaphragms and the walls between them operate in the manner of a dash-pot.

The two diaphragms 71, 72 are of equal effective area and are interconnected by a rod 77 carrying a stirrup 78 which projects into the second of the end spaces and the diaphragm assembly 71, 72, 77 is loaded by a compression spring 79 accommodated in the first of the end spaces. The stirrup 78 has mounted in it a needle valve element 80 so arranged as to co-operate with the outlet port 81 of a pipe line 82 from a primary pressure fluid source at high pressure so that as the diaphragm assembly 71, 72, 77 is moved by increase of pressure in the first end space the needle valve element 80 moves in the sense of opening the ports 81, and vice versa. The primary pressure fluid source may be any convenient source of pressure fluid, say the engine lubricating oil pressure supply.

When the load due to the pressure in the first end space 73 together with the spring load exceed the load due to the pressure in the second end space 75, the valve 80 will be opened to increase the pressure in the second end space 75, and when the pressure in the second end space is the greater the valve will tend to close. Thus it is arranged that the pressure in the second end space 75 exceeds the pressure in the first end space 73 by a substantially constant amount dependent upon the load due to the spring 79. Thus when the shuttle valve 54 above referred to is the position in which it restricts the ports 52, 53 equally, the pressure in the second capsule will exceed the pressure in the engine air intake by half the above constant amount; it may be arranged that this amount is compensated for by the load of the spring acting on the lever carrying the half-ball valve 27, and thus in each condition of the shuttle valve the fuel flow will be varied in accordance with the engine air intake pressure.

In another arrangement, there is provided a second valve such as the valve 80 which is connected between the space 55 and a point in the engine at engine intake pressure, and which is arranged so that the pressure in space 55 is engine intake pressure, plus, say, 5 lbs. per sq. in., and the conduit 57 is maintained at engine intake pressure plus, say, 10 lbs. per sq. in. In this way the pressure in chamber 51 will vary between 5 and 10 lbs. per sq. in. above engine intake pressure.

The temperature-sensitive element 38 may be positioned to be subjected to any desired temperature of the combustion products which the element will withstand, such as the combustion chamber outlet temperature where this is not excessive, or the turbine outlet temperature.

Furthermore, instead of a shuttle valve as above described, the temperature-sensitive means may comprise a restricted connection from the pressure fluid source to the capsule and a variable bleed-off controlled in accordance with the temperature. The pressure fluid source in this case would be maintained at a pressure which is a fixed amount higher than the air intake pressure, and the bleed-off will be arranged to decrease the fuel flow on increase of temperature and vice versa.

In another arrangement, which may be used where there is an adequate supply of fluid, such as air or oil under pressure, suitable for the purpose, instead of the conduit 57 being connected to the pressure reducing valve arrangement described above, it may be connected to a chamber in one wall of which there is provided a spring-loaded relief valve, loaded on its downstream side by engine intake pressure (or atmospheric pressure), the chamber also being connected through a bore affording some degree of restriction to a primary pressure fluid source at high pressure, such as the engine lubricating oil supply or the compressor of a gas turbine engine. Thus the pressure in conduit 57 will depend on engine intake pressure (or atmospheric pressure) and the load of the relief valve spring. A small-area restrictor may be provided in the conduit to the primary pressure fluid source, to minimise wastage of fluid. This arrangement may in certain cases have a flow through the relief valve which is large compared with the flow through port 53, thus minimising the possibility of interaction between this valve and the valve 53, 54.

In the appended claims the expression "atmospheric pressure" should be read as including the engine intake pressure which is atmospheric pressure as modified by the motion of the engine.

We claim:

1. A control system for an engine having a fuel system for supplying fuel to the engine and including a fuel-supply-control element, the engine being of the kind in which the temperature at a point therein increases on increase of the rate of supply of fuel and vice versa, said control system comprising temperature sensitive means having a temperature-sensitive element at said point in the engine at which the temperature is to be controlled, pressure-responsive means connected to load said fuel-supply-control element to vary the rate of fuel supply according to the pressure sensed thereby, a pressure liquid source, means to control the pressure of said source including pressure-reducing valve means connected to said source, a pressure-sensitive element connected to said valve means and subjected in one sense to atmospheric pressure and in the opposite sense to the pressure of said liquid downstream of said pressure-reducing valve means, and resilient means to load said pressure-sensitive element in said one sense, and further valve means connected to the downstream side of said pressure-reducing valve means and to said pressure-responsive means to vary the proportion of the pressure of said liquid downstream of said pressure-reducing valve means to which said pressure-responsive means is subjected so that variation in one sense causes a reduction in the rate of fuel supply, and means connecting said further valve means and said temperature-sensitive means to move said further valve means to adjust said proportion in said one sense when said temperature exceeds a selected value.

2. A control system for an engine having a fuel system for supplying fuel to the engine and including a fuel-supply-control element, the engine being of the kind in which the temperature at a point therein increases on increase of the rate of supply of fuel and vice versa, said control system comprising temperature-sensitive means having a temperature-sensitive element at said point in the engine at which the temperature is to be controlled, pressure-responsive means connected to load said fuel-supply-control element to vary the rate of fuel supply according to the pressure sensed thereby, a pressure liquid source, means to control the pressure of said source including pressure-reducing valve means connected to said source, a pressure-sensitive element connected to said valve means and subjected in one sense to atmospheric pressure and in the opposite sense to the pressure of said liquid downstream of said pressure-reducing valve means, and resilient means to load said pressure-sensitive element in said one sense, and a double-acting shuttle valve element co-operating with a pair of aligned ports of which one is connected to the downstream side of said pressure-reducing valve means and of which the other opens to a space at atmospheric pressure, and the space between said ports being connected to said pressure-responsive means to vary the proportion of the pressure of said liquid downstream of said pressure-reducing valve means to which said pressure-responsive means is subjected so that variation in one sense causes a reduction in the rate of fuel supply, and a tappet connecting said shuttle valve element and said temperature-sensitive means to move said shuttle valve element to adjust said proportion in said one sense when said temperature exceeds a selected value.

3. A control system for an engine having a fuel system for supplying fuel to the engine and including a fuel supply control element, the engine being of the kind in which the temperature at a point therein increases on increase of the rate of supply of fuel and vice versa, said control system comprising temperature-sensitive means having a temperature-sensitive element at said point in the engine at which the temperature is to be controlled, pressure-responsive means connected to load said fuel-supply-control element to vary the rate of fuel supply according to the pressure sensed thereby, a first pressure liquid source, means to control the pressure of said source including first reducing-valve means connected to said source, a first pressure-sensitive element connected to said valve means and subjected in one sense to atmospheric pressure and in the opposite sense to the pressure of said liquid downstream of said pressure-reducing valve means and first resilient means to load said pressure-sensitive element in said one sense, a second pressure liquid source, means to control the pressure of said second source including second pressure-reducing valve means connected to said second source, a second pressure-sensitive element connected to said second valve means and subjected in said one sense to atmospheric pressure and in the opposite sense to the pressure of said liquid downstream of said second pressure-reducing valve means and second resilient means to load said second pressure-sensitive element in said one sense, the load applied by said second resilient means to said second pressure-sensitive element being less than the load applied by the first resilient means to said first pressure-sensitive element, and a double-acting shuttle valve element co-operating with a pair of aligned ports of which one is connected to the downstream side of said first pressure-reducing valve means and of which the other is connected to the downstream side of said second pressure-reducing valve means, and the space between said ports being connected to said pressure-responsive means to vary the proportion of the pressure of said liquid downstream of said first pressure-reducing valve means to which said pressure-responsive means is subjected so that variation in one sense causes a reduction in the rate of fuel supply, and a tappet connecting said shuttle valve element and said temperature-sensitive means to move said shuttle valve to adjust said proportion in said one sense when said temperature exceeds a selected value.

References Cited in the file of this patent

UNITED STATES PATENTS

| 2,440,241 | Armstrong | Apr. 27, 1948 |
| 2,669,094 | Lee | Feb. 16, 1954 |

FOREIGN PATENTS

| 592,769 | Great Britain | Sept. 29, 1947 |